United States Patent [19]
Robinson

[11] 3,953,632
[45] Apr. 27, 1976

[54] RESIN IMPREGNATED MATS AND METHOD OF MAKING THE SAME

[75] Inventor: Leonard W. Robinson, Trenton, Mich.

[73] Assignee: Woodall Industries Inc., Detroit, Mich.

[22] Filed: Apr. 29, 1974

[21] Appl. No.: 465,419

[52] U.S. Cl.................................. 428/95; 428/96; 428/97; 428/286; 428/290
[51] Int. Cl.²................. D03D 27/00; D04H 11/00; D05C 17/00
[58] Field of Search.............................. 161/62–67, 161/151, 247, 250, 251, 256, 257, 264, 270; 260/37 N, 38, 39 R, 39 SB, 42.18; 428/95, 96, 97, 286, 290

[56] References Cited
UNITED STATES PATENTS

| | | | |
|---|---|---|---|
| 2,724,675 | 11/1955 | Williams | 161/261 |
| 3,348,992 | 10/1967 | Cochran | 161/67 |
| 3,733,226 | 5/1973 | Stoller | 161/67 |
| 3,790,417 | 2/1974 | Paterson | 161/261 |

*Primary Examiner*—Marion E. McCamish
*Attorney, Agent, or Firm*—Collins, Oberlin & Darr

[57] ABSTRACT

This application discloses mats of randomly oriented plastic fibers, that have been impregnated with one of a group of special resin systems, and then heat treated and shaped, to provide decorative and/or structural panels having remarkable properties of sound deadening and resistance to breaking under conditions encountered in automotive, recreational, marine and industrial uses.

16 Claims, 8 Drawing Figures

RESIN IMPREGNATED MATS AND METHOD OF MAKING THE SAME

BACKGROUND OF THE INVENTION

1. Field of the Invention

The present invention relates broadly to fiber reinforced elements of plastic, and to methods of and materials for making them. More particularly, it has to do with elements of this character that are made up by employing particular resin systems to saturate fibrous bodies, which are then cured and molded to desired configurations.

2. Description of the Prior Art

Molded articles of plastic are of course old and well known, as are fiber reinforced plastics, impregnated fibrous structures, and decorative and structural panels of hardboard, fiberboard, foamed resins, and resin impregnated glass cloth.

However, for the most part, the prior structures, especially when employed in the areas for which the articles of this invention are particularly designed, have exhibited a variety of defects and have failed to provide a full range of the desirable properties necessary to adequately meet sophisticated present-day requirements.

SUMMARY OF THE INVENTION

Accordingly, it is a primary aim of this invention to provide fiber reinforced plastic articles that possess an unusual number of desirable features and that can be readily formed for use as automotive headliners, package trays, door panels, quarter panels, seat backs, floor boards, trunk liners, dash mats and the like; and for similar uses in trucks, mobile homes, boats, snowmobiles, and other travel and recreational vehicles; as well as for a wide variety of other uses in both related and unrelated fields.

Another, and more specific, object of the invention is the provision of such articles in which the unwoven, randomly oriented fibers in the mats or paddings to be impregnated can be of various compositions and deniers, and can also be mixtures of different fibers and deniers that can vary in density or weight per square yard as required to give the structural, functional or working properties required for given applications.

Another object is to provide articles of this character in which the impregnating resin system combines a particular amino type resin with a thermoplastic resin.

Still another object is the provision of such articles and methods of making them, in which the working temperatures and pressures are lower, and the times required for completing the finished products are shorter, than for previously available counterparts.

Further objects and advantages of the invention will become apparent during the course of the following description when taken in connection with the accompanying drawings.

BRIEF DESCRIPTION OF THE DRAWINGS

In the drawings, wherein like numerals are employed to designate like parts throughout.

DESCRIPTION OF THE PREFERRED EMBODIMENTS

Although as indicated above, the article of the invention is adaptable to a wide variety of forms and uses, it has to date, found its widest application and most enthusiastic acceptance in the automotive field and, specifically, for employment as decorative, structural and facing panels in the interiors of automobiles where its sound deadening properties and resistance to breakage during installation and use are of primary importance.

Figure 1:
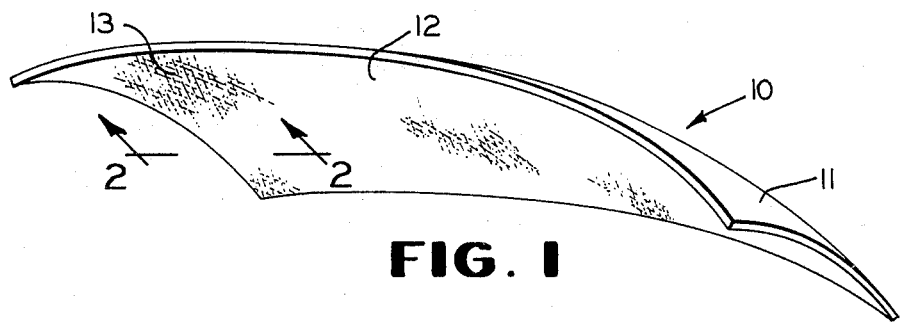
FIG. 1 is a perspective view of a headliner for an automobile, produced in accordance with the invention.
Figure 2:
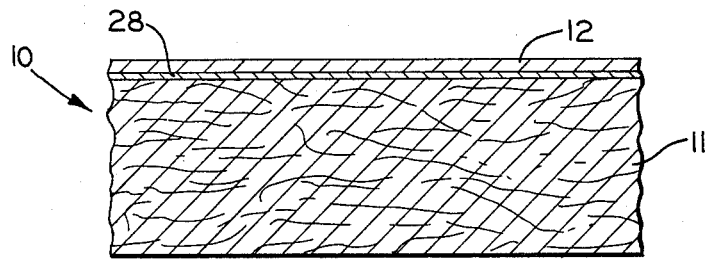
FIG. 2 is a fragmentary sectional view taken substantially along the line 2—2 in FIG. 1.

For example, as illustrated in FIGS. 1 and 2 of the drawings, a preferred form of the article of the invention is ideally suited for use as a passenger car headliner 10. Thus, the article 10 has been shaped to fit into and provide a desired ceiling contour for a particular automobile; and it comprises a suitably cured, fiber reinforced, resin impregnated mat 11, provided with a covering layer 12 which may be embossed, textured, or otherwise decorated, as at 13, to either match or complement the interior finish of the automobile.

In producing the headliner 10, a long strip or a cut shape 14 of selected fiber mat or padding material is first impregnated with the desired resin system, and this may be done by any suitable and adequate procedure for doing so. By way of example only, the strip or cut shape of mat 14 may be saturated with resin 15 in a bath thereof contained in an open tank 16, by passing the mat over a roll 17, downwardly under a roll 18 and into the resin 15; then upwardly out of the bath, and between a pair of rolls 19 and 20 that act to remove any surplus resin before the saturated mat passes beyond the tank 16.

After being impregnated, the mat 14 can be air dried, or it can be introduced immediately into and passed through a suitable oven or kiln 21, which is heated, as by the elements 22, to a temperature sufficient to at least partially cure the resin system in the mat. Preferably the resin is only partially cured during this step and, at the same time, the mat is partially shaped and/or reduced in thickness, as by passing it through shaping and/or pressing rolls 23 and 24. Thereafter, when it is desired to complete production of the headliner 10, the partially cured and sized or shaped mat 14 is introduced into a press or mold 25 in which opposing dies or pressure plates 26 and 27 are shaped to produce in the pressed or molded sheet the desired surface contour, which may be planar or conform to any simple, compound or complex shape or curvature.

It will be obvious that any conventional type of curing, sizing, shaping and molding equipment other than that illustrated may be employed in producing mats 11 for articles such as the headliner 10, and that these mats can be cut to their intended outline shape before, after, or at some suitable stage during their curing and shaping.

The panels of this invention may be used just as they come from their final curing and shaping treatment, and in this connection, the dies 26 and 27 may have their surfaces textured, engraved, embossed, or otherwise treated to impart a particular kind of utilitarian or decorative appearance to any exposed face or faces of the shaped and cured mat. Nevertheless, for automotive use, it is currently preferred to provide the covering layer 12, which may be of cardboard or other suitable material that has previously been treated to provide a desired surface color, texture and/or pattern, and which may be bonded to the mat 11 as by an adhesive 28.

Figure 3:
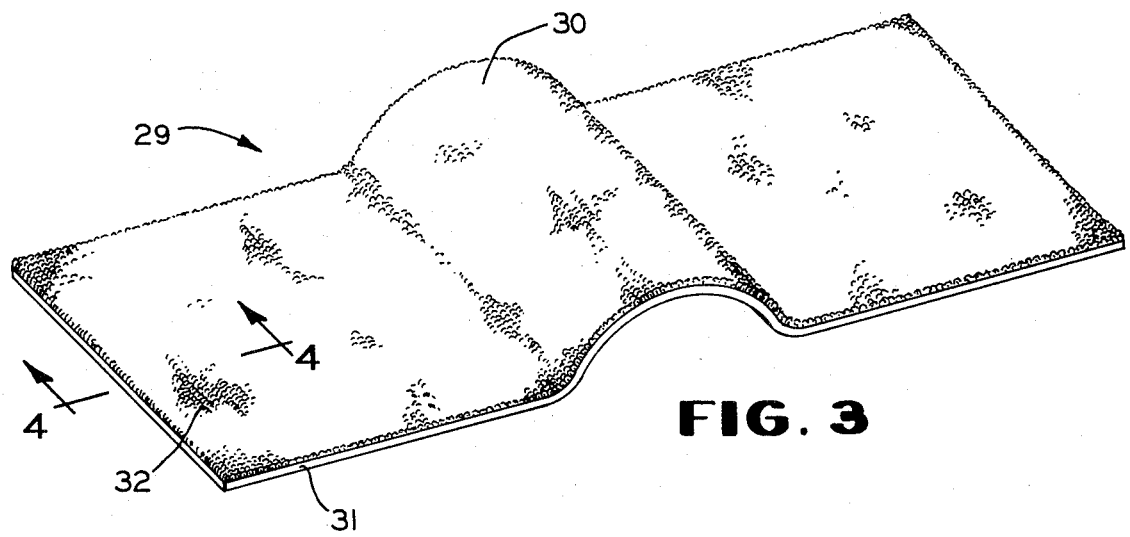
FIG. 3 is a perspective view of another form of the article of the invention, showing the impregnated fiber mat having been constructed, treated and shaped for use as a floor board or floor mat.

The floor board or floor mat 29 of FIG. 3 is similar to the article of FIGS. 1 and 2, except that it is provided with a raised portion 30 for the drive shaft housing which complicates its shape, and that the impregnated fiber mat base 31 thereof is provided with a covering which includes an outer layer of carpet 32 and an interposed layer 33 of paper.

The carpet and paper layers 32 and 33 may be laminated to each other and to the base 31, by layers of adhesive 34 and 34a as separate operations or as part of the curing, sizing, shaping or molding steps and, if desired, a suitable covering can also be bonded to the opposite or lower surface of the base mat 31 in the same way. The layer of carpeting 32, of course, serves both a decorative and a utilitarian purpose, and may be employed either with or without the intermediate paper layer. Where the paper layer is used, it can be of any desired weight and composition that is determined to be necessary to lend the required stiffness, strength, rigidity or other property deemed important in the board, panel or mat. Also, where paper cannot impart the wanted property, woven or other forms of intermediate layers may be substituted.

Two important features of the floor board or mat 29 as just described, that have been widely praised by the automotive industry, are that it does not break in handling, even when a worker inadvertently steps directly on the sharply raised portion, and that it prevents a surprising amount of road and engine noise from reaching the interior of the automobile.

Figure 4:
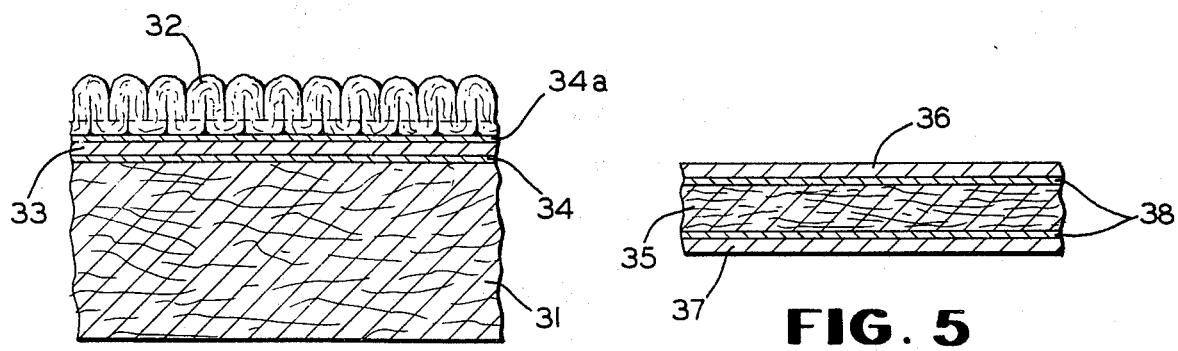
FIG. 4 is a sectional view, similar to that of FIG. 2, but taken substantially along the line 4—4 in FIG. 3.

The production of the article of FIGS. 3 and 4 follows a procedure that is generally similar to that described for the article of FIGS. 1 and 2 although, as already indicated, materials employed in making different parts can be selected and varied in a number of ways to obtain the particular properties desired in each.

However, among the features that are important in the fiber mats of the invention, regardless of the end product, are that they be made of unwoven, randomly oriented fibers and, preferably, fibers of plastic materials, such as the polyesters.

Similarly, the resin systems employed to impregnate the fiber mats, are resin systems that include an amino resin selected from a special group of such resins that consists of melamine-formaldehyde, hexamethoxymethylmelamine, and urea-formaldehyde resins. Of these, the melamine-formaldehyde resins are preferred and, among the particular resin systems that have proven to be especially well adapted for use in the automotive field are the following:

I.

| | |
|---|---|
| Melamine-formaldehyde | 10 to 60% |
| Ethylene-vinyl chloride copolymers with acid generating catalyst | 90 to 40% |

In a preferred form this system is made up of approximately 40% of the melamine-formaldehyde resin, and approximately 60% of the ethylene-vinyl chloride copolymers with the acid generating catalyst, in a water solvent.

II.

This is a variation of I that includes an amide functional group with the ethylene-vinyl chloride copolymer.

III.

This is a variation of II that substitutes a carboxylic group for the amide functional group in the thermoplastic resin of that system.

IV.

| | |
|---|---|
| Melamine-formaldehyde | 10 to 60% |
| Self-reactive vinyl acetate copolymer latex with acid generating catalyst | 90 to 40% |

In a preferred form this system, like systems I, II, and III, is made up of approximately 40% of the melamine-formaldehyde resin, and approximately 60% of the copolymer (self-reactive vinyl acetate copolymer latex) or thermoplastic resin, with the acid generating catalyst.

V.

| | |
|---|---|
| Melamine-formaldehyde | 10 to 60% |
| Self-reactive vinyl acetate copolymer latex | 54 to 20% |
| Ethylene-vinyl chloride copolymer with acid generating catalyst | 45 to 20% |

In a preferred form this system, which is a composite of I and IV, is made up with approximately 40% of the melamine-formaldehyde type resin, approximately 30% of the self-reactive vinyl acetate copolymer latex, and approximately 30% of the ethylene-vinyl chloride copolymer, with the acid generating catalyst.

VI.

| | |
|---|---|
| Melamine-formaldehyde | 5 to 50% |
| Unmodified phenolic resin | 75 to 20% |
| Vinyl chloride copolymer with acid catalyst | 20 to 60% |

In a preferred form this system, which includes an unmodified phenolic resin, is made up of approximately 25% of the melamine-formaldehyde resin, approximately 50% of the unmodified phenolic resin, and approximately 25% of the vinyl chloride copolymer with the acid catalyst, which may be organic or inorganic.

VII.

| | |
|---|---|
| Melamine-formaldehyde with acid catalyst | 20 to 80% |
| Water soluble modified phenolic resin | 80 to 20% |

In a preferred form this system, which is somewhat similar to VI, but includes a modified phenolic resin and omits the copolymer, is made up of approximately 20% of the melamine-formaldehyde resin with the acid cartalyst, and approximately 80% of the modified phenolic resin.

The resin systems of I through IV are water soluble systems, and the resin combinations of V are in a water phase condition; while, in the systems of VI, the carrier or solvent may be water, or an alcohol similar to ethanol, and in VII it may be water or an alcohol or a blend thereof.

Specific examples of melamine-formaldehyde resins that have given excellent results in the above are American Cyanamid Company's "Cyrez" 933 and Monsanto Company's "Scriptoset" 101 and "Resimene" 842. However, hexamethoxymethylmelamine or urea-formaldehyde resins may be substituted for the melamine-formaldehyde in any of the above systems, and examples of suitable hexamethoxymethylmelamine resins are American Cyanamid Company's "Cymel" 300 (solid) and "Cymel" 301 (liquid), while examples of proven urea-formaldehyde resins are Monsanto Company's "Resimene" X-730 and "Resimene" X-970.

In the particular thermoplastic resins of systems I, II, III and V, Monsanto's polymerized "monflex" resin series have been used as the thermoplastic resin ingredient in actually practicing the invention, being modified with amide ("Monflex" 4514) for system II, and with carboxyl ("Monflex" 4814) for system III; and, in system IV, the vinyl acetate monomer is preferably polymerized with vinyl chloride to give a vinyl acetate-vinyl chloride copolymer. Other examples of thermoplastic resins employable in one or more of the systems of the invention are National Starch's cross linked resins (25-2802) with vinyl chloride and polyvinyl chloride and Borden Chemical Company's "Polyco" 2136, 2181, and 2182.

For the acid catalyst in the several resin systems, boric acid, oxalic acid, zinc nitrate or other acid radical producing compounds in amounts of from 1 to 2%, depending on the catalyst and based on the solids, may be used.

In all of the resin systems of the invention, necessary solvents or carriers, wetting and suspension agents, defoamers, pH controllers, fire retardents and the like can be included in the formulation, and can be varied with the composition of the materials of the various mats as required for specific applications.

Figure 8:
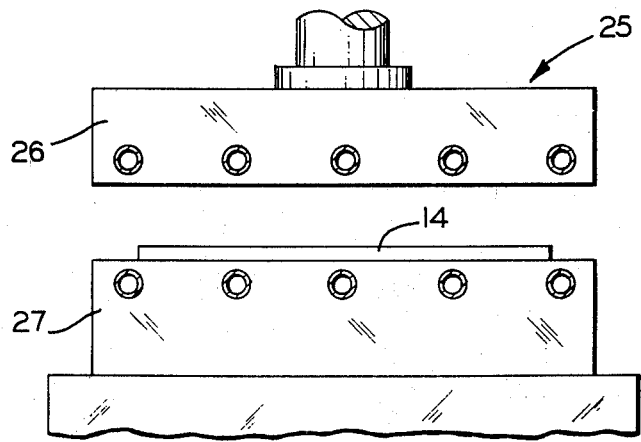
FIG. 8 is a vertical, sectional view through a form of heated mold or press for finally shaping and curing the resin impregnated fiber mat.

As emphasized above, the resin systems of the invention can be cured, and the mats impregnated with them can be shaped, drawn where necessary, and cured, in a short time and at relatively low temperatures and pressures. For example, even when dies of complicated contours are substituted for the pressure plates 26 and 27 in FIG. 8, a pad of randomly oriented fibers saturated with a resin system of the invention, can be finally cured and shaped to the contour of the dies, with as much as two inches of draw or stretch, in the curing time and at the curing temperature for the resin system, with a pressure of only 10 p.s.i..

Of course the amount of pressure employed will depend on the amount of compaction desired in the impregnated mat, as well as upon the shape to which it is to be molded. Thus, in the articles of FIGS. 1 through 4, a relatively slight compaction of the mats is preferred. This is because a relatively low density in the mat of the finished article or panel insures the unusual sound absorbing and sound deadening properties which are an important asset in these automotive parts. On the other hand, for different purposes, a high density in the impregnated mat may be desired, and this can be achieved by increasing the degree of compaction of the mat by increasing the amount of pressure exerted during curing.

Figure 5:
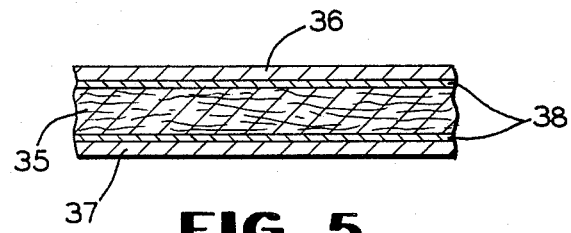
FIG. 5 is a sectional view similar to those of FIGS. 2 and 4, but taken through still another form of the article of the invention.
Figure 6:
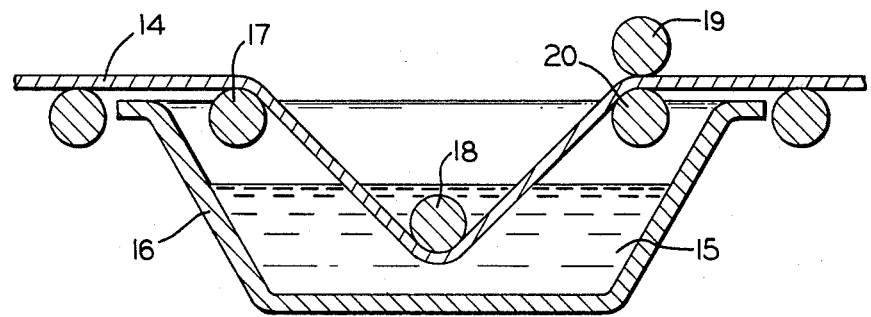
FIG. 6 is a longitudinal sectional view through a simplified form of apparatus for impregnating or saturating the fiber mat with the resin system.
Figure 7:
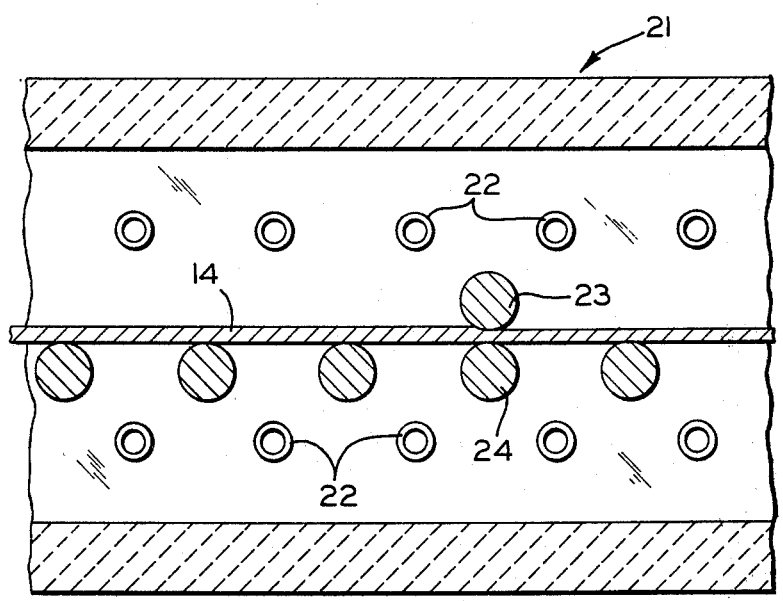
FIG. 7 is a longitudinal sectional view through a heating oven or kiln for partially curing and shaping the impregnated fiber mat.

For example, there is illustrated in FIG. 5 of the drawings a panel, usable as an inexpensive trunk liner, quarter panel or the like, that is made up of an impregnated mat 35 that has been compressed to extreme thinness during curing and which may be provided with covering layers 36 and/or 37 by bonding them to one or both surfaces of the high density mat with an adhesive 38.

In the same connection, an article or panel of the invention may also be produced with both high and low density portions in different sections of its area by merely varying the degree of compacting pressure exerted on one area from that exerted on one or more other areas during the final shaping and curing step.

Accordingly, it is to be understood that the forms of the invention herein shown and described are to be taken as preferred embodiments only thereof, and that various structural, procedural, and compositional changes may be resorted to without departing from the spirit of the invention as defined in the following claims.

I claim:

1. As a new article of manufacture, a compressed mat of randomly oriented plastic fibers, impregnated with a heat cured resin system including a thermosetting resin selected from the group consisting of melamine-formaldehyde, hexamethoxymethylmelamine and urea-formaldehyde resins, and a thermoplastic copolymer that is the product of the polymerization of a plurality of monomers at least one of which is a vinyl compound with an acid generating catalyst; pressure shaped to conform to a desired contour.

2. An article as defined in claim 1, in which said vinyl compound is vinyl acetate.

3. An article as defined in claim 1, in which said vinyl compound is vinyl chloride.

4. An article as defined in claim 1, in which said fibers are of polyester plastic, and said copolymer is a vinyl copolymer.

5. An article as defined in claim 1, in which said copolymer is vinyl acetate-vinyl chloride.

6. An article as defined in claim 1, in which said copolymer is ethylene-vinyl chloride.

7. An article as defined in claim 1, in which said resin system includes a plurality of thermoplastic copolymers.

8. An article as defined in claim 1, in which said resin system contains from 5 to 60% of said selected resin, and from 20% to 90% of said copolymer.

9. An article as defined in claim 1, in which said selected resin is melamine-formaldehyde.

10. An article as defined in claim 1, in which said selected resin is hexamethoxymethylmelamine.

11. An article as defined in claim 1, in which said resin system includes a phenolic resin.

12. An article as defined in claim 1, in which a decorative covering is bonded to at least one surface thereof.

13. An article as defined in claim 12, in which said covering includes an exposed layer of carpeting, and a layer of paper between said carpeting and said one surface.

14. A method of producing a fiber reinforced plastic article, comprising saturating a mat of randomly oriented plastic fibers with a resin system comprising a mixture of a heat curable resin selected from the group consisting of melamine-formaldehyde, hexamethoxymethylmelamine and urea-formaldehyde resins and a thermoplastic copolymer that is the product of the polymerization of a plurality of polymers at least one of which is a vinyl compound with an acid generating catalyst, in liquid form, preliminarily compressing said saturated mat and partially curing said heat curable resin in said resin system by heat and pressure, and then finally curing said heat curable resin in said resin system and shaping said mat to its finished form by a further application of heat and pressure.

15. A method as defined in claim 14, which includes the additional step of bonding a covering layer to a surface of said article.

16. A method as defined in claim 15, in which said additional step is performed during and utilizes the heat and pressure application of said final curing step.

* * * * *